United States Patent Office 3,455,987
Patented July 15, 1969

---

3,455,987
p-HYDROXYLAMINOBENZOYLAMINOACETO-NITRILES AND PREPARATION THEREOF
Morris Freifelder, Waukegan, Ill., assignor to Abbott Laboratories, Chicago, Ill., a corporation of Illinois
No Drawing. Filed June 17, 1966, Ser. No. 558,252
Int. Cl. C07c *121/66, 103/30, 83/00*
U.S. Cl. 260—465
9 Claims

ABSTRACT OF THE DISCLOSURE p-Hydroxylaminobenzoylaminoacetonitriles and related N-acyl compounds and those carrying a chlorine atom on the phenyl ring are useful anti-bacterials; a new process for the preparation of these compounds is also provided.

---

The present invention is directed to new antibacterial compounds; more particularly it is directed to p-hydroxylaminobenzamides of the formula I 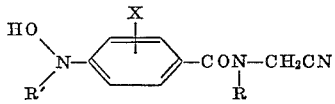

wherein X is hydrogen or chlorine, R is hydrogen or R'', and R' is hydrogen or R''CO with each R'' being a saturated hydrocarbon chain of 1–4 carbon atoms.

In a general embodiment, the new compounds are prepared by hydrogenating a p-nitrobenboylaminoacetonitrile (NBA) which may optionally carry a chlorine substituent in the 2- or 3-position and in which the amido-nitrogen carries the desired substituent R, in a suitable inert, organic solvent and in the presence of between 1–10% by weight of quinoline or pyridine (based on the amount of said NBA) or at least one equivalent of an acid anhydride of the formula $(R''CO)_2O$, with gaseous hydrogen in the presence of between 0.1% to 0.5% of platium (calculated as Pt-metal based on the amount of said NBA) at a temperature between 0° and 60° C. and at a pressure between atmospheric pressure and 100 p.s.i.g. The platinum used as a catalyst in this hydrogenation is preferably deposited on a carrier such as alumina, asbestous, carbon, bentonite, silical gel, kieselguhr, in an amount of between 1–10%; however, other commonly used forms of catalytic platinum may be used, e.g. platinum oxide.

The above reference to a "suitable, inert, organic solvent" is meant to express that the solvent used does not take part in the reaction and does not interfere with any of the components present in the hydrogenation mixture or the desired end product. Suitable solvents are methyl collosolve, benzene, methanol, ethanol, isopropanol, ethyl acetate, butyric acid, acetic acid, etc. The desired hydroxylamino compound can be isolated from the reaction mixture by simple evaporation after removal of the catalyst. When the hydrogenation mixture contains quinoline or pyridine, the free hydroxylamino compound is obtained which may be further reacted with a lower fatty acid anhydride to make corresponding products carrying an N-acylhydroxylamino group in the p-position to the amido group. When the hydrogenation mixture instead contains a lower fatty acid anhydride, the N-acylhydroxylamino group is directly obtained in a single-step process.

To better understand the process of the present invention, reference is made to the following examples which are meant as illustrations only.

EXAMPLE 1

N-(2-chloro-4-hydroxylaminobenzoyl)aminoacetronitrile

A solution of 9.6 g. of N-(2-chloro-4-nitrobenzoyl)-aminoacetonitrile in 100 ml. of methyl cellosolve containing 1 ml. of quinoline is hydrogenated in the presence of 0.3 g. of a 5% platinum-on-carbon catalyst at room temperature and at a pressure of between 38–40 p.s.i.g. Uptake of 2 moles of hydrogen is completed in 10 minutes. The mixture is filtered, the catalyst is washed with alcohol and, after combining the filtrate and alcohol wash liquor, the solution is evaporated under reduced pressure with only slight warming. The residue is recrystallized from 25% aqueous alcohol to yield 7.5 g. (83% of theory) of N-(2 - chloro - 4 - hydroxylaminobenzoyl)aminoacetonitrile. The new compound begins to decompose at 154° C.; the infrared spectrum supports the assigned structure and the nuclear magnetic resonance spectrum shows the presence of three replaceable protons.

EXAMPLES 2–5

Using the identical procedure as in Example 1, the compounds shown in Table 1 having the structure of Formula I (R'=H) are made from the corresponding p-nitro compounds

TABLE 1

| Example | Compound R | Compound X | Percent Yield | Physical data |
|---|---|---|---|---|
| 2 | H | H | 87 | Decomp., 127° C. |
| 3 | H | 2-chloro | 83 | Decomp., 154° C. |
| 4 | CH₃ | do | 52 | M.P., 110° C. |
| 5 | C₂H₅ | do | 77 | M.P., 134–135° C. |

When the quinoline used in the above procedure is replaced by an equal amount in pyridine, essentially the same results are obtained.

EXAMPLE 6

N-(2-chloro-4-N-acetylhydroxylaminobenzoyl)aminoacetonitrile

A solution of 10 g. of N-(2-chloro-4-nitrobenzyl) aminoacetonitrile in 150 ml. of glacial acetic acid and 5 ml. of acetic anhydride is hydrogenated in the presence of 1.0 g. of 5% platinum-on-carbon at room temperature and at a pressure of about 30 p.s.i.g. Uptake of 2 moles of hydrogen is complete in 20 minutes; the reaction appears to stop at this point. The mixture is filtered and the catalyst is washed with ethanol. The wash liquor and filtrate are combined, evaporated to dryness and the residue is recrystallized from 25% aqueous alcohol. The pure compound is obtained in a yield of 50% of theory; it starts to decompose at 154° C. and its infrared and nuclear magnetic resonance spectra confirm the assigned structure.

When in the above process, glacial acetic acid and acetic anhydride are replaced by equimolar amounts of propionic acid and its anhydride, N-(2-chloro-4-N-propionylhydroxylaminobenzoyl)aminoacetonitrile is obtained.

EXAMPLES 7–9

By following the procedure of Example 6, the compounds listed in Table 2 having the structure of Formula I with R'=CH₃CO are made from the corresponding intermediates carrying a p-nitro group.

TABLE 2

| Examples | Compound R' | Compound X | Percent Yield | Physical data |
|---|---|---|---|---|
| 7 | H | H | 83 | M.P. 216–218° C. |
| 8 | CH₃ | 2-chloro | 77 | M.P. 164° C. |
| 9 | C₂H₅ | do | 68.5 | M.P. 184° C. |

The above compounds are also obtained by modifying the above process in using ethyl acetate as the solvent and having one molar equivalent of acetic anhydride present in the hydrogenation mixture. When the above starting materials are replaced by the isomers carrying a chloro group in the 3-position, the corresponding 3-chloro-4-N-acetylhydroxylaminobenzamides are obtained in substantially the same yields.

From the above examples it will be seen that the new compounds can be produced in good to excellent yields in an extremely fast and economical process. Since room temperature is sufficient in the new hydrogenation process, no advantage is seen in using temperatures above about 40°; also, since pressures of below 50 p.s.i.g. are sufficient, no particular advantage is seen in using higher pressures. The fact that the above reaction only requires low hydrogen pressures enables the use of so-called low pressure equipment such as a Parr shaker, a round-flask or a simple still. Because the reaction leading to the new compounds takes place almost instantaneously under mild conditions, the described process is particularly well-suited for continuous operation.

It will be seen from the above examples that quinoline or pyridine are used in the hydrogenation mixture where the compounds of Formula I are desired wherein R' is hydrogen. Under the defined conditions, hydrogenation slows down drastically at the point where two molar equivalents of hydrogen are taken up so that the end point of the reaction is easily observed. On the other hand, when acetic anhydride or butyric anhydride are used in conjunction with an inert solvent in the hydrogenation mixture, the corresponding acylated products are obtained. In those instances, hydrogen uptake ceases completely when two molar equivalents of hydrogen are absorbed.

It is very surprising to see that the process of the present invention leads to good yields of compounds of Formula I since it is known that catalytic hydrogenations of nitro groups in most instances proceed to amino groups, that nitrile groups are affected by such a process and that aromatic halogens are frequently lost under hydrogenation conditions. All these possible and undesirable reactions are eliminated by the presence of the above specified amounts of quinoline, pyridine or the fatty acid anhydrides in the amounts specified. These components, therefore, are the necessary "modifiers" for the process of the present invention; in their absence a chlorine substituent, if any, may be lost and/or the triple bond in the nitrile side-chain may be attacked. It will be apparent to those skilled in the art that the inert solvent used as a hydrogenation medium has to be selected in such a manner that it does not react with the catalyst modifier present, e.g. when an acid anhydride is used as the modifier, ethanol does not qualify as an inert solvent according to the above definition since it would react with the anhydride.

The starting materials for the preparation of the compounds of the present invention are made from the corresponding p-nitrobenzoylchloride which may carry a chloro substituent on the ring by reacting said compound with aminoacetonitrile. A suitable procedure consists in adding aminoacetonitrile hydrogen sulfate to a chilled solution of sodium hydroxide and sodium carbonate in water and adding thereto, under stirring, p-nitrobenzoylchloride, continuing the stirring at room temperature for several hours and recrystallizing the solid precipitate obtained.

The above described new compounds are useful as antibacterials; specifically, a solution of the above compounds containing between 50 and 1000 parts per million completely inhibits the in-vitro growth of staphylococcus aureus. To make an antibacterial composition of the above compounds, it is usually indicated to take an organic solvent as a medium. The latter solution can then be diluted with water and, where the active compound is soluble in water, a clear solution is obtained; where the active compound is not sufficiently water soluble, a fine dispersion or suspension is obtained. Useful solvents for making the initial, more concentrated solution are ethanol, dimethylformamide and other, preferably water-miscible organic media.

I claim:

1. A compound of the formula

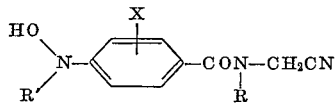

wherein X is hydrogen or chlorine, R is hydrogen or R'', and R' is hydrogen or R''CO with each R'' being a saturated hydrocarbon chain of a 1–4 carbon atoms.

2. The compound of claim 1 wherein X is chlorine, and R and R' both are hydrogen.

3. n-(2-chloro-4-hydroxylaminobenzoyl)aminoacetanitrile.

4. The process of making a substituted benzamide of the formula

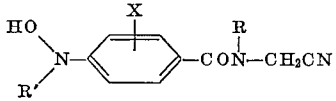

wherein X is hydrogen or chlorine, R is hydrogen or R'', and R' is hydrogen or R''CO with each R'' being a saturated hydrocarbon chain of 1–4 carbon atoms, consisting essentially in the steps of hydrogenating a solution of a nitro compound of the formula

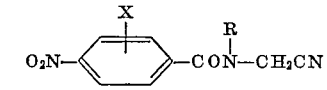

wherein R and X have the above meaning in an inert, organic solvent in the presence of 1–10% by weight of quinoline or pyridine or at least one molar equivalent of a fatty acid anhydride of the formula (R''CO)₂O with gaseous hydrogen in the presence of 0.1–0.5% by weight of catalytic platinum at a temperature between 0° and 60° C. and under a pressure between atmospheric pressure and 100 p.s.i.g., removing the catalyst from the mixture obtained, and isolating said benzamide from the solution.

5. The process of claim 4 wherein said nitro compound is hydrogenated in the presence of at least one equivalent of acetic anhydride.

6. The process of claim 5 wherein said inert organic solvent is acetic acid.

7. The process of claim 4 wherein said nitro compound is hydrogenated in the presence of 1–10% by weight of quinoline.

8. The process of claim 4 wherein said platinum is supported on carbon.

9. The process of claim 4 wherein said hydrogenation is carried out at room temperature.

References Cited

UNITED STATES PATENTS

| 2,423,180 | 7/1947 | Doumani et al. | 260—566 |
| 2,631,167 | 3/1953 | Werner | 260—580 |
| 2,927,126 | 3/1960 | Pursglove | 260—465 |

(Other references on following page)

| | | | |
|---|---|---|---|
| 3,063,980 | 11/1962 | Bloom et al. | 260—580 |
| 3,079,435 | 2/1963 | Freifelder et al. | 260—580 |
| 3,145,231 | 8/1964 | Kosak | 260—580 |
| 3,177,258 | 4/1965 | Rylander et al. | 260—580 |
| 3,291,832 | 12/1966 | Kosak | 260—580 |
| 3,253,021 | 5/1966 | Linder et al. | |
| 3,301,652 | 1/1967 | Linder et al. | |

OTHER REFERENCES

Rhoue-Poulenc, Chemical Abstracts, vol. 64, p. 19504a, 1966.

Grudzinski et al., Chemical Abstracts, vol. 62, p. 7674b, 1965.

Groggins, Unit Processes in Organic Synthesis, pp. 172–173, 1958.

Nord, Berichte, vol. 52, pp. 1705–1713, 1919.

CHARLES B. PARKER, Primary Examiner.

S. T. LAWRENCE III, Assistant Examiner.

U.S. Cl X.R.

260—559, 578, 580; 424—304

PO-1050
(5/69)

UNITED STATES PATENT OFFICE
CERTIFICATE OF CORRECTION

Patent No. 3,455,987  Dated July 15, 1969

Inventor(s) Morris Freifelder

It is certified that error appears in the above-identified patent and that said Letters Patent are hereby corrected as shown below:

In column 1, line 31, "p-nitrobenboylamino-" should be corrected to read -- p-nitrobenzoylamino- --; on line 54, "collosolve" should be corrected to read -- cellosolve --.

In column 2, line 45 "nitrobenzyl" should be corrected to read -- nitrobenzoyl --.

In column 4, line 29, "n" should be capitalized.

SIGNED AND
SEALED
MAR 3 1 1970

(SEAL)
Attest:

Edward M. Fletcher, Jr.
Attesting Officer

WILLIAM E. SCHUYLER, JR.
Commissioner of Patents